United States Patent [19]

Gorfinkel et al.

[11] Patent Number: 5,300,789
[45] Date of Patent: Apr. 5, 1994

[54] ARTICLE COMPRISING MEANS FOR MODULATING THE OPTICAL TRANSPARENCY OF A SEMICONDUCTOR BODY, AND METHOD OF OPERATING THE ARTICLE

[75] Inventors: Vera B. Gorfinkel, Saratov, Russian Federation; Sergey Luryi, Bridgewater, N.J.

[73] Assignee: AT&T Bell Laboratories, Murray Hill, N.J.

[21] Appl. No.: 814,745

[22] Filed: Dec. 24, 1991

[51] Int. Cl.$^5$ ............... H01L 27/14; H01L 31/00
[52] U.S. Cl. ............................. 257/21; 257/15; 257/184; 257/459; 359/248
[58] Field of Search ............... 257/21, 14, 15, 185, 257/186, 447, 448, 184, 459, 465, 466; 359/248

[56] References Cited

U.S. PATENT DOCUMENTS

| | | | |
|---|---|---|---|
| 4,894,526 | 1/1990 | Bethea et al. | 257/15 |
| 5,023,685 | 6/1991 | Bethea et al. | 257/440 |
| 5,075,749 | 12/1991 | Chi et al. | 257/21 |

FOREIGN PATENT DOCUMENTS

| | | | |
|---|---|---|---|
| 0306400A1 | 3/1989 | European Pat. Off. | G02F 1/01 |
| 0432035A1 | 6/1991 | European Pat. Off. | H01S 3/19 |

OTHER PUBLICATIONS

"Observation of Stark Shifts in Quantum Well Intersubband Transitions", by A. Harwit et al., Applied Physics Letters, 50 (11), Mar. 16, 1987, pp. 685–687.

"Inducing Normally Forbidden Transitions with the Conduction Band of GaAs Quantum Wells", J. L. Pan et al, Applied Physics Letters 57 (4), Jul. 23, 1990, pp. 366–368.

"Rapid Modulation of Interband Optical Properties of Quantum Wells by Intersubband Absorption", by V. B. Gorfinkel et al., Applied Physics Letters, 60 (25), Jun. 22, 1992, pp. 3141–3143.

"All-optical Modulation Using an n-Doped Quantum-Well Structure", by S. Noda et al., Journal of Applied Physics, 68(12), Dec. 15, 1990, pp. 6529–6531.

European Search Report, The Hague, Jul. 26, 1993, Examiner R. Iasevoli.

*Primary Examiner*—Sara W. Crane
*Attorney, Agent, or Firm*—Eugen E. Pacher

[57] ABSTRACT

An article that comprises novel means for modulating the transparency of a semiconductor body in accordance with a modulating signal is disclosed. The body comprises one or more quantum wells (QWs), and the modulation mechanism comprises changing the free carrier distribution function in the QWs. An important feature of the inventive article is the use of (relatively long wavelength) inter-subband radiation (ISBR) to change the transparency of the body for (relatively short wavelength) inter-band radiation (IBR). In preferred embodiments the modulating signal is an electric field applied across the QWs, such that ISBR absorption can be tuned by means of the Stark effect. One embodiment of the invention makes it possible to rapidly modulate IBR, and another embodiment can form narrow (typically less than 10 ps) IBR pulses.

22 Claims, 5 Drawing Sheets

ARTICLE COMPRISING MEANS FOR MODULATING THE OPTICAL TRANSPARENCY OF A SEMICONDUCTOR BODY, AND METHOD OF OPERATING THE ARTICLE

FIELD OF THE INVENTION

This invention pertains to means for modulating optical radiation. It also pertains to means for generating short optical pulses, as well as to methods of operating articles and systems (herein collectively "articles") that comprise modulating means and/or pulse generating means.

BACKGROUND OF THE INVENTION

In many areas of technology (e.g., optical data processing, optical communications) it is necessary to modulate optical radiation [including continuous wave ("CW") radiation] in accordance with a given signal. A conventional technique for modulating the output of a semiconductor laser is the modulation of the laser drive (pump) current. This technique can be used for modulation frequencies up to the so-called electron-photon resonance (EPR) frequency, which typically is of order 10 GHz. However, for fundamental reasons the above conventional technique does not result in efficient modulation of the laser output for modulation frequencies substantially above the EPR frequency. However, it can be expected that the trend towards higher and higher bit rates in, e.g., optical communications systems will continue, demanding means for modulating optical radiation at higher and higher frequencies, ultimately at frequencies above the EPR frequency.

Recent work in the USSR inter alia has shown that the optical output of a semiconductor heterojunction laser can be modulated at frequencies above the EPR frequencies, exemplarily as high as 100 GHz or even higher, by a novel mechanism that involves heating of the free electrons in the active layer of the laser by an electric field applied parallel to the active layer, driving a lateral electric current through that layer. See V. B. Gorfinkel et al., *Soviet Physics Semiconductor*, Vol. 24(4), April 1990, p. 466; S. A. Gurevich et al., *Joint Soviet-American Workshop on the Physics of Semiconductor Lasers*, May 20–Jun. 3, 1991, p. 67; and V. B. Gorfinkel et al., *International Journal of Infrared and Millimeter Waves*, June 1991, all incorporated herein by reference. In the cited publications is disclosed a AlGaAs-GaAs separate-confinement heterostructure single quantum well (QW) ridge laser that comprises, in addition to the conventional pumping contact, two contacts for carrier heating. By means of current pulses applied to the heating contacts it was possible to raise the temperature of the free carriers about 100K above the ambient (lattice) temperature, resulting in modulation of the laser output.

Figure 1:
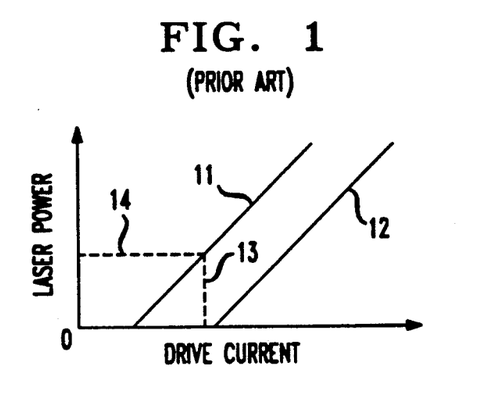
FIG. 1 schematically illustrates output characteristics of a prior art laser.

FIG. 1 schematically illustrates modulation in the above discussed laser. Curve 11 represents the conventional situation, namely, laser emission when the free carrier temperature is equal to the lattice temperature. Raising the free carrier temperature above the lattice temperature by means of the heating current results in increased loss in the active region, shifting the lasing onset to a higher drive current, resulting in curve 12. As can readily be seen, modulation of the free carrier temperature thus results in modulation of the laser power. For instance, if a constant drive current of value 13 is applied, the laser output power can be switched between 0 and value 14. Since the free carrier temperature can be raised very quickly and also relaxes to the lattice temperature extremely quickly, in a time of order $10^{-12}$s, high modulation frequencies are in principle possible.

However, free carrier heating by means of electric current frequently will be undesirable, since the heating power derives solely from the logic controlling circuit. Moreover, in the prior art device relatively large power is dissipated by the holes, due to their large effective density of states. Furthermore, in practice it will frequently be difficult to achieve uniform heating of the free carriers, again resulting in performance deterioration. Thus, in view of the importance of efficient very high frequency modulation means, it would be highly desirable to have available such means that are substantially free of at least some of the above such discussed drawbacks. This application inter alia discloses such modulation means.

GLOSSARY AND DEFINITIONS

A "quantum well" (QW) herein is a semiconductor region of a first composition, sandwiched between (and epitaxial with) semiconductor regions of a second composition, with the first and second compositions chosen such that the bandgap energy associated with the first composition is less than the bandgap energy associated with the second composition, and with the thickness of the first composition layer selected such that associated with the layer is at least one bound state energy level for at least one carrier type (i.e., electron or hole), with the energy level not coinciding with the corresponding (classical) band edge (i.e., conduction or valence band edge, as the case may be).

The "bandgap energy" associated with a given semiconductor composition is the energy difference between the valence band edge and the conduction band edge. By conventional extension, the "bandgap energy" associated with a QW is the energy difference between the highest energy hole state and the lowest energy electron state in the QW.

By "inter-band radiation" (IBR) we mean herein electromagnetic radiation of wavelength that corresponds to the bandgap energy associated with an appropriate semiconductor region, typically a QW (or QWs) in the active region of a device according to the invention.

By "inter-subband radiation" (ISBR) we mean herein electromagnetic radiation of wavelength that corresponds, or can be made to correspond, to the energy difference between a first and a second bound state energy level in an appropriate QW (or QWs) in the active region of a device according to the invention.

The "free carrier distribution function" is a function of quasi-momentum, position, and time. At a given position in the device, it characterizes both the concentration of carriers and their distribution in energy. In particular, in regions of the device where the carrier concentration is high (exemplarily exceeding $10^{17}/cm^3$), the distribution function practically coincides with the Fermi distribution function even under non-equilibrium conditions. In this case the distribution function is parameterized by the quasi-Fermi level and the effective carrier temperature, which may be different from the lattice temperature.

By "changing" the free carrier distribution function we mean varying its shape, in general. For the Fermi-function this corresponds to the variation in either the quasi-Fermi level or the carrier temperature, or both.

SUMMARY OF THE INVENTION

In a broad aspect the invention is embodied in an article that comprises novel means for modulating the optical transparency of a semiconductor body, as well as in a method of operating an article that comprises such means. The novel means comprise means for changing the free carrier distribution function in a predetermined region of the semiconductor body (typically a QW or QWs) by absorption of inter-subband radiation.

Exemplarily, the radiation to be modulated is interband radiation (IBR), but modulation of ISBR is also contemplated. Significantly, the wavelength of the ISBR is longer than that of the IBR, the former exemplarily being $CO_2$ laser radiation ($\lambda \sim 10$ μm), and the latter exemplarily being radiation from a III/V semiconductor laser ($\lambda$ in the approximate range 0.5-5 μm). Those skilled in the art will know that prior art optical modulation and switching generally involves pump radiation of wavelength shorter than that of the signal radiation, and will recognize that use of long-wavelength radiation (the ISBR) to effect, e.g., modulation of short wavelength radiation (the IBR) is a fundamental departure from prior practice.

More specifically, in one embodiment the invention comprises an article (e.g., an optical communication system or an optical computing system) that comprises a semiconductor body comprising a multilayer structure including at least one QW. Associated with the QW is a bandgap energy and a subband energy difference, and associated with the body is a lattice temperature. Free carriers of a first conductivity type (exemplarily electrons) are either present in the QW, due to doping, or can be generated in the QW by IBR absorption. Associated with these carriers is a free carrier distribution function. The article also comprises means for providing a modulation signal to the body. Significantly, the article further comprises means for providing electromagnetic radiation of a first wavelength (the IBR) to the body, the first wavelength selected to correspond to the bandgap energy. The article still further comprises means for providing electromagnetic radiation of a second wavelength (the ISBR) to the body, with the second wavelength being longer than the first, and selected such that the free carrier distribution function can be changed in accordance with the modulation signal, such that the IBR is modulated in accordance with the modulation signal. The article also comprises utilization means for modulated IBR, e.g., a length of optical fiber, or an optical detector.

In currently preferred embodiments the body comprises contact means that are adapted for applying an electric field across the QW (preferably QWs), whereby the subband energy difference associated with the QW (or QWs) can be "tuned" by means of the Stark effect. Preferred contact means comprise appropriately doped QWs (to be referred to as "contact QWs") designed such that ISBR is substantially not absorbed in the contact QWs for any value of the applied field within the normal operating range of the device.

In an article according to the invention as described above, varying the transparency of the body through varying the free carrier distribution function can result in a modulator-like device or in a pulse source-like device, depending on choice of operating parameters such as intensity of IBR (and ISBR) provided to the body, and length of time during which ISBR is being absorbed in the QWs. Moreover, it is contemplated that the modulator can be included in the internal or external cavity of an IBR laser, thus forming a controlled-absorption element.

In particular, for relatively low intensities of IBR and/or ISBR, and/or relatively short ISBR absorption time, the number of excess (with respect to the equilibrium number at the lattice temperature) electron/hole pairs created in the body is relatively small, and only a relatively small "spike" of IBR is emitted from the body when ISBR absorption ceases. The maximum intensity during a given "ON" period of the modulated IBR exceeds the equilibrium intensity during the ON period by less than 10%, typically by less than 5% or even 1%. The spike is caused by the rapid recombination of the excess electron/hole pairs, stimulated by the IBR. In the described mode the device functions substantially modulator-like.

On the other hand, for relatively high intensities of IBR and/or ISBR, and/or relatively long ISBR absorption time, the number of excess electron/hole pairs can be relatively large, and a substantial pulse of IBR is emitted when ISBR absorption ceases. In this pulse source-like mode the maximum intensity exceeds the equilibrium intensity by more than 100%, preferably by more than tenfold. The pulse can be very narrow, exemplarily less than 10 ps. Such ultrashort pulses are of interest in a variety of scientific and technological fields (e.g., soliton transmission), and use of an article according to the invention as a pulse former is contemplated.

A further exemplary embodiment of the invention comprise means for applying an electric field across the QW, substantially as described, and means for providing ISBR to the body, also substantially as described. The transparency of the body is varied by Stark effect-tuning. However, no IBR is provided, and ISBR is modulated in accordance with the applied electric modulating signal. The modulated ISBR is emitted from the body and is utilized by appropriate utilization means.

Those skilled in the art will appreciate that the above-described semiconductor body can be a stand-alone device or can be monolithically integrated with an appropriate semiconductor laser. They will also appreciate that QW doping levels are to be chosen in accordance with the contemplated device function. For instance, if the body is to be used as a modulator, then QW doping levels of order $10^{12}/cm^2$ will frequently be suitable. On the other hand, if it is to be used as a pulse former, then substantially lower QW doping (including no intentional doping) will at least in some cases be desirable.

Semiconductor bodies according to the invention can be based on substantially any direct gap semiconductor material, e.g., on III/V materials such as GaAs, InGaAs or InP. Material systems wherein the QW free electrons have a relatively low effective mass can result in particularly efficient devices according to the invention. Electrons have a substantially lower effective mass in a InGaAs QW than in GaAs QW.

The invention is also embodied in a method of operating an article as described above. The method comprises providing electromagnetic radiation of a first wavelength and a modulation signal to the body. Significantly, the first wavelength is selected to correspond to the bandgap energy, the radiation thus is IBR. The method further comprises providing radiation (ISBR)

of a second wavelength longer than the first wavelength, selected such that the free carrier distribution in the QW is varied in accordance with the modulation signal, such that the IBR is modulated in accordance with the modulation signal. The modulated IBR is emitted from the body and provided to modulated IBR utilization means.

DETAILED DESCRIPTION OF SOME PREFERRED EMBODIMENTS

Although it is possible to modulate the ISBR intensity by appropriate means, thereby changing the free carrier (typically electron) distribution function in the QW (typically QWs), and consequently modulating the transparency of the semiconductor body to the IBR (whereby the IBR is modulated in accordance with the ISBR modulation), this is currently not a preferred approach. Instead, we currently prefer embodiments that comprise use of substantially CW ISBR (including relatively long ISBR pulses), with modulation achieved through varying the absorption of ISBR by means of an electrical modulation signal applied to the body.

Figure 2:
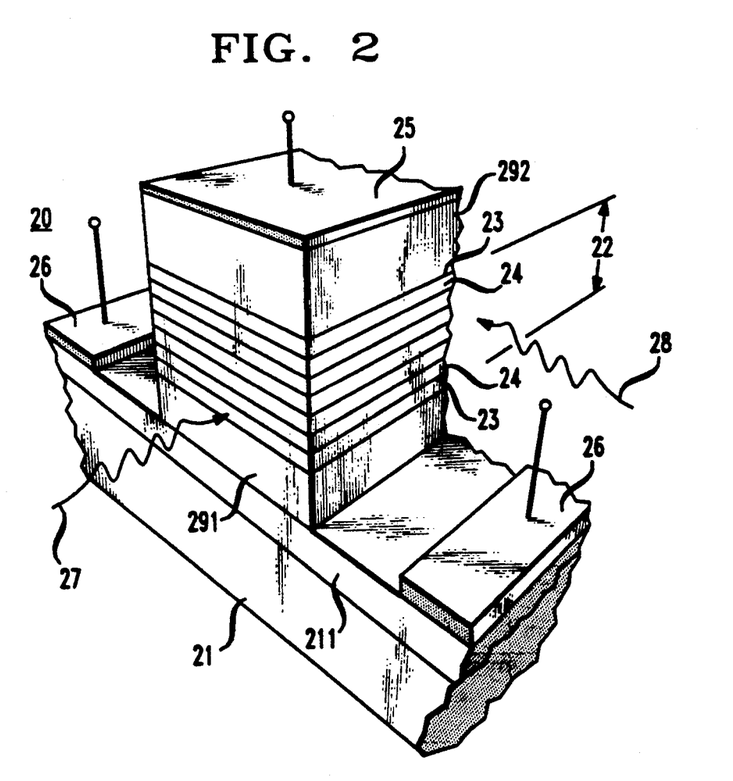
FIGS. 2 and 5 schematically depict exemplary bodies according to the invention.

An exemplary embodiment of a preferred body 20 according to the invention is shown schematically in FIG. 2, wherein numeral 21 refers to the semiconductor substrate (e.g., GaAs or InP), 211 to a conductive semiconductor layer, 22 to the multi-QW active region of the structure, and 25 and 26 to contact means that facilitate application of a modulation field across the active region. Region 22 comprises QWs 23 and barrier layers 24. The semiconductor compositions are selected such that the multilayer structure forms a waveguide at least for IBR 27, which typically is incident on the multilayer structure in the longitudinal direction associated with the ridge-like portion of the structure. ISBR 28 is also incident on the active region of the structure, typically in a direction that is normal to the longitudinal direction. ISBR preferably is single mode and is TM polarized. The active (core) region exemplarily is modulation doped, although direct doping of the QWs is also contemplated. Modulation doping is well known in the art. Regions 291 and 292 have a lower effective refractive index than 22 and thus form the cladding regions of a waveguide structure. Some further aspects of the structure will be described in the context of FIG. 5.

Figure 3:
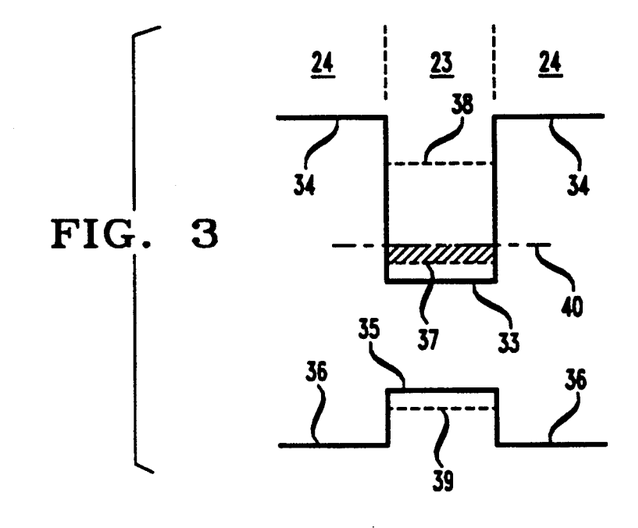
FIGS. 3 and 4 schematically show relevant aspects of the band structure, respectively with and without an electric field applied across the QW.

FIG. 3 schematically depicts the relevant portion of an energy level diagram for a QW 23 and the adjacent barrier layer regions 24. Numerals 33 and 34 refer to the (classical) conduction band edges of the QW and barrier regions, respectively, and 35 and 36 to the corresponding valence band edges. Numerals 37 and 38 refer to the lowest and next higher bound electron energy levels, 39 to the highest bound hole energy level, and 40 to the quasi-Fermi energy level associated with the electrons in the QW. As those skilled in the art will recognize, IBR is associated with transitions between 39 and 37 and ISBR with transitions between 37 and 38.

Analogously to the situation depicted in FIG. 1, changing the free carrier absorption function by, e.g., heating of the electron gas in the QWs by means of absorption of ISBR, increases the loss for IBR (i.e., decreases the transparency of the multilayer structure for IBR), resulting in lower optical output power, as compared to the output in the absence of electron heating.

Significantly, ISBR is selected such that, in the absence of an applied electric field across active region 22, ISBR is substantially not absorbed in the active region. Furthermore, ISBR is selected such that application of an appropriate electric field across the active region results in absorption of ISBR, and consequently in a change of the electron distribution function, exemplarily through heating of the electrons in the QW, and in increased absorption of IBR.

Figure 4:
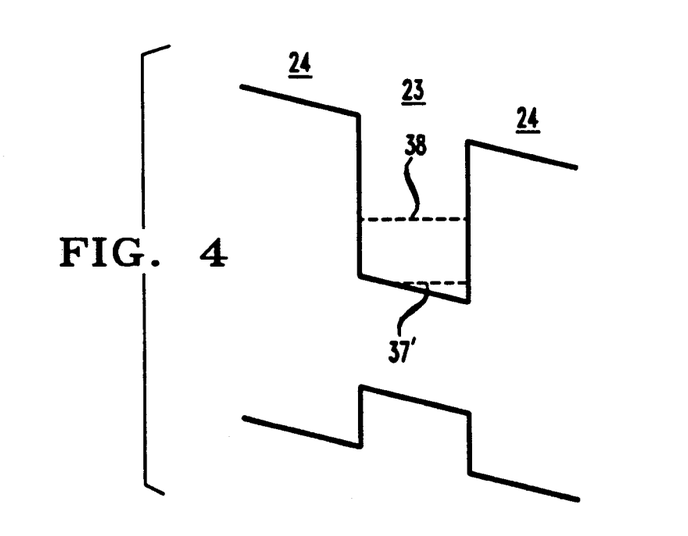

Those skilled in the art are familiar with the fact that application of an electric field across a QW results in a "tilt" in the energy bands, as depicted schematically in FIG. 4. This tilt can result in a change (typically a decrease) in the energy difference between the relevant two subbands (e.g., electron levels 37' and 38), also as indicated schematically in FIG. 4. It is this Stark effect tuning that is utilized in preferred embodiments of the invention.

As discussed above, devices according to the invention not only can serve as radiation modulators (preferably as modulators of IBR, but not excluding modulators of ISBR) but also as sources of very short pulses of IBR. This will now be discussed further, for simplicity's sake in terms of "heating" of the free carriers.

It is known that in a two-level system the number of carriers in the upper level is a function of the temperature of the carriers, with the maximum number of carriers in the upper level increasing with increasing carrier temperature. Thus, heating of the carriers by means of absorption of ISBR in a structure according to the invention results in an increase of the number of carriers in the upper level. As soon as absorption of ISBR ceases the carrier temperature relaxes back to the lattice temperature, much faster than the excess number of electrons and holes relaxes to their steady-state values corresponding to the given level of IBR and the ambient temperature. This non-stationary situation results in an enhanced electron-hole recombination stimulated by the IBR and leads to the formation of a very short pulse of IBR. Such pulses are useful in a variety of scientific fields but may also find use in, e.g., optical communications, for instance, in soliton systems. In this situation, the mode content of IBR is not changed since the feedback from the modulator to the IBR laser is typically small. This means that ultra-short pulses of single-mode IBR can be formed in this fashion.

However, it should also be apparent to those skilled in the art that inclusion of the presently described structure into the optical cavity of the IBR laser will result in a feedback mechanism between the structure and the laser itself. In this situation, at the same value of the pumping current in the IBR laser, much larger accumulation of electrons and holes will occur in the active laser region when the structure absorbs ISBR, thus providing an additional loss mechanism. As soon as the ISBR absorption ceases, the excess electrons and holes in the laser will recombine in a stimulated emission process, producing a very powerful short pulse. This mode of pulse forming is contemplated mainly for those applications where single-mode nature of IBR is not required.

Figure 5:
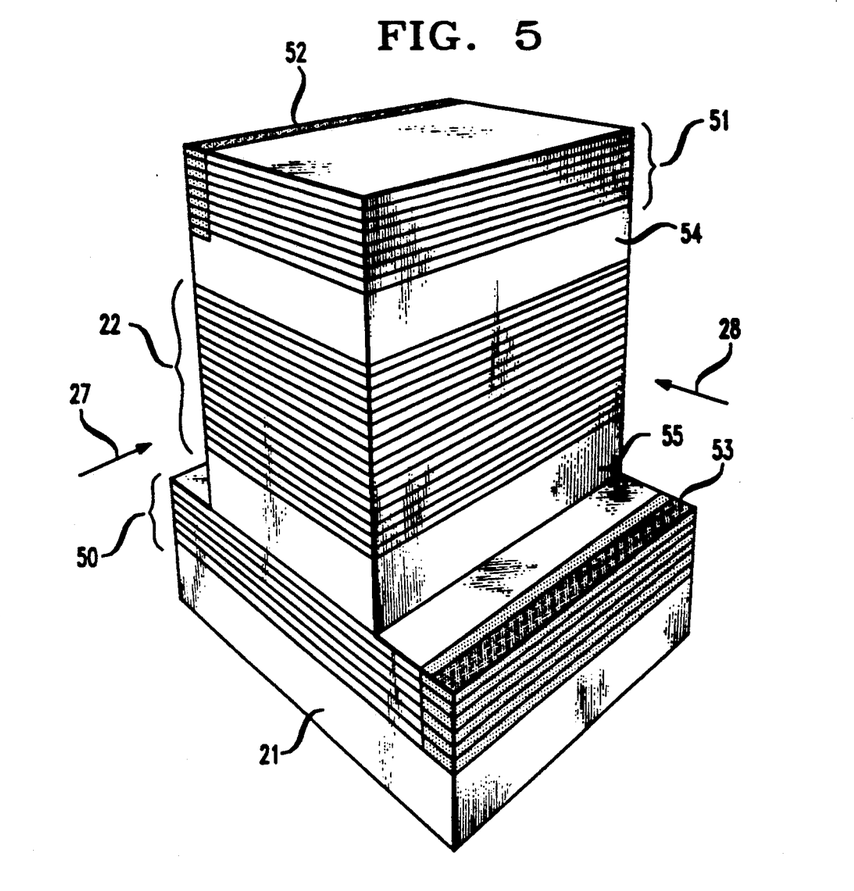

FIG. 5 schematically depicts an exemplary preferred embodiment of the invention, which comprises two doped QW regions 50 and 51. The QWs of 50 and 51 will be referred to as "contact QWs".

Advantageously the composition and thickness of the contact QWs are chosen such that, under normal operating conditions, ISBR is substantially not absorbed in regions 50 and 51. That is to say, the contact wells are designed such that the energy corresponding to ISBR is less than the inter-subband separation energy associated with the contact wells. Furthermore, it will typically be advantageous to provide single mode TM polarized (i.e., magnetic vector in the plane of the QWs, electric vector normal to the plane of the QWs) ISBR, since TM polarization provides maximum absorption of ISBR in the core QWs, and at the same time minimum absorption in the contact QWs. Thus, in preferred embodiments of the invention the means for providing ISBR comprise means for appropriately polarizing the output, and selecting a single mode, of an appropriate source of ISBR, e.g., a $CO_2$ laser.

In FIG. 5, numerals 52 and 53 refer to contact means. Such means can be formed in known fashion (involving, for instance, diffusion or ion implantation), and 52 advantageously has limited lateral extent, to minimize absorption of ISBR in the metallic contact region.

As will be recognized by those skilled in the art, active region 22 typically will have a refractive index greater than that of regions 54 and 55. The structure thus desirably forms a waveguide for IBR, with 22 corresponding to the core, and 54 and 55 to the cladding. It is also desirable to design the multilayer structure such that ISBR is substantially confined to the core region, with only a small part of the ISBR field extending beyond the cladding layers 54 and 55 into regions 51 and 50, respectively. The intensity of ISBR in the core region can be enhanced by means of an appropriate reflecting structure. Multilayer dielectric mirrors that can serve as a reflector are known.

Figure 7:
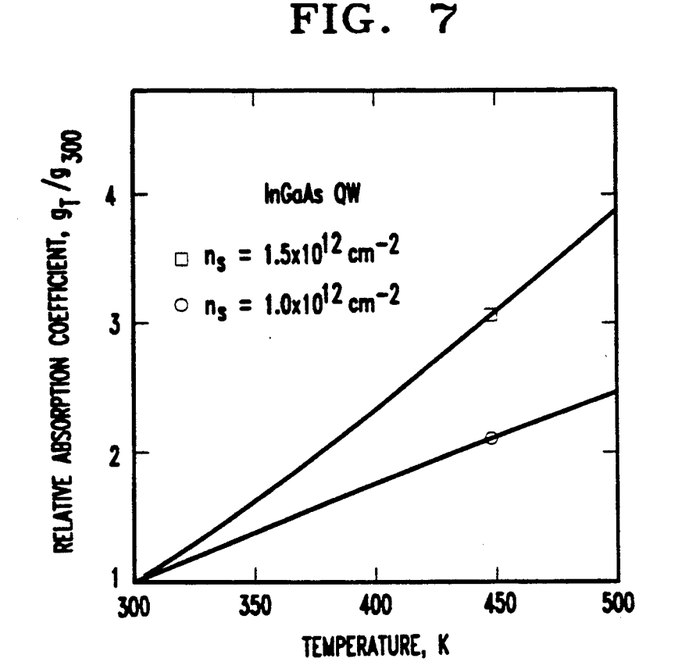
FIGS. 7 and 8 show exemplary calculated curves of relative absorption coefficient vs. excess free carrier temperature.
Figure 8:
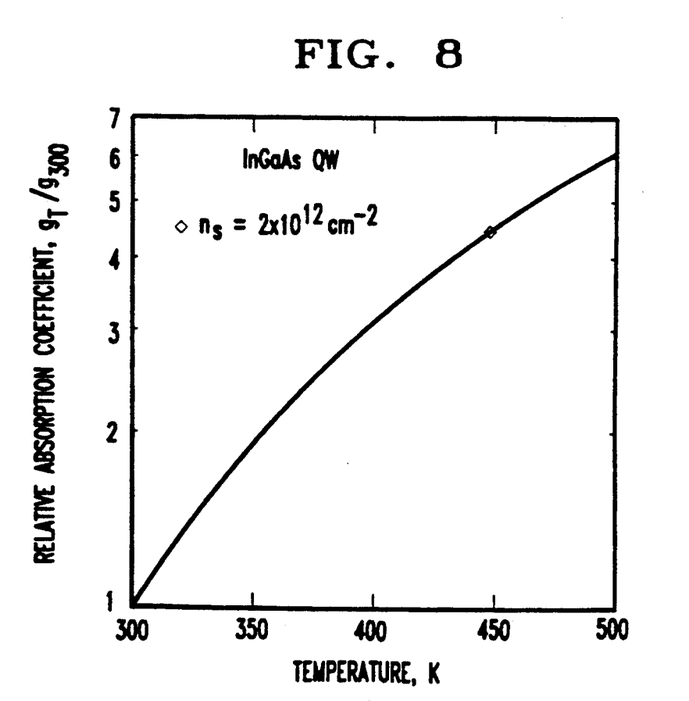

FIGS. 7 and 8 show exemplary computed curves for the relative absorption coefficient ($g_T/g_{300}$) as a function of electron temperature, for a GaAs QW, for three values of electron concentration in the QW. The lattice temperature is 300K in all cases. As the curves show, the relative absorption coefficient increases rapidly with increasing electron concentration, indicative of the possibility of efficient modulation.

Figures 9, 9A, 9B, 9C:
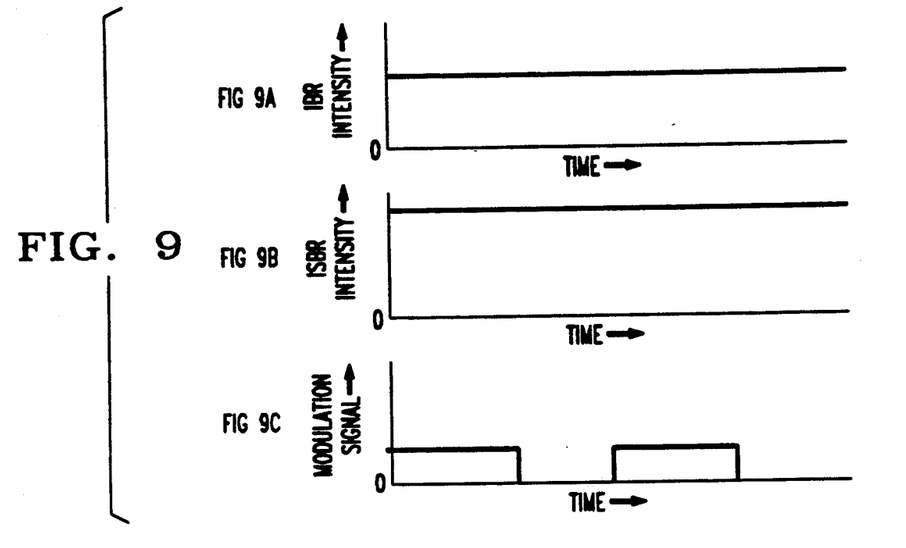
FIGS. 9a or 9c schematically depict inputs to an exemplary pulse-former according to the invention.
Figure 10:
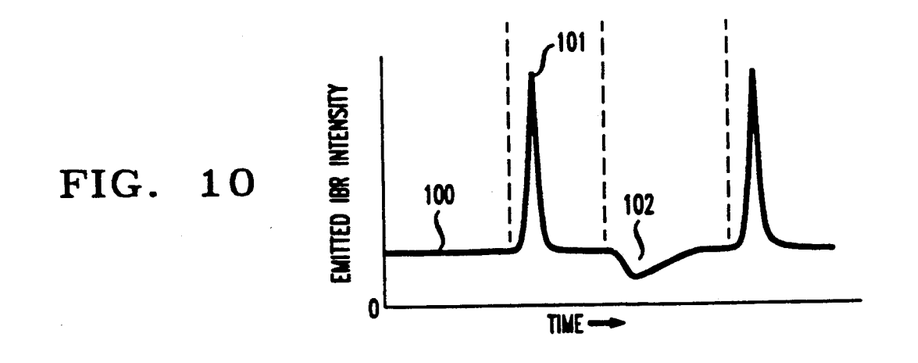
FIG. 10 schematically depicts the transmitted IBR corresponding to the inputs of FIG. 9.

FIG. 9 schematically shows exemplary "inputs" to a device according to the invention which exhibits pulse-former-like characteristics. As shown, both IBR and ISBR are CW, and the (electrical) modulation signal has binary form. FIG. 10 shows the IBR intensity emitted from the inventive pulse-former. The IBR input intensity is assumed to be sufficiently large such that substantially all IBR is transmitted through the body, due to self-induced transparency. Thus, there is present a non-zero equilibrium intensity 100. Abruptly switching off the modulation voltage causes a sharp drop of the ISBR absorption in the body. The resulting non-equilibrium electron/hole distribution rapidly relaxes towards the value associated with the lattice temperature by means of recombination, resulting in emission of narrow pulse 101. When the modulation field is re-applied the ISBR absorption increases again rapidly, resulting in added IBR absorption in the body, manifested by "dip" 102. As soon as transparency of the body is again attained, the system is ready for another "discharge".

Figure 6:
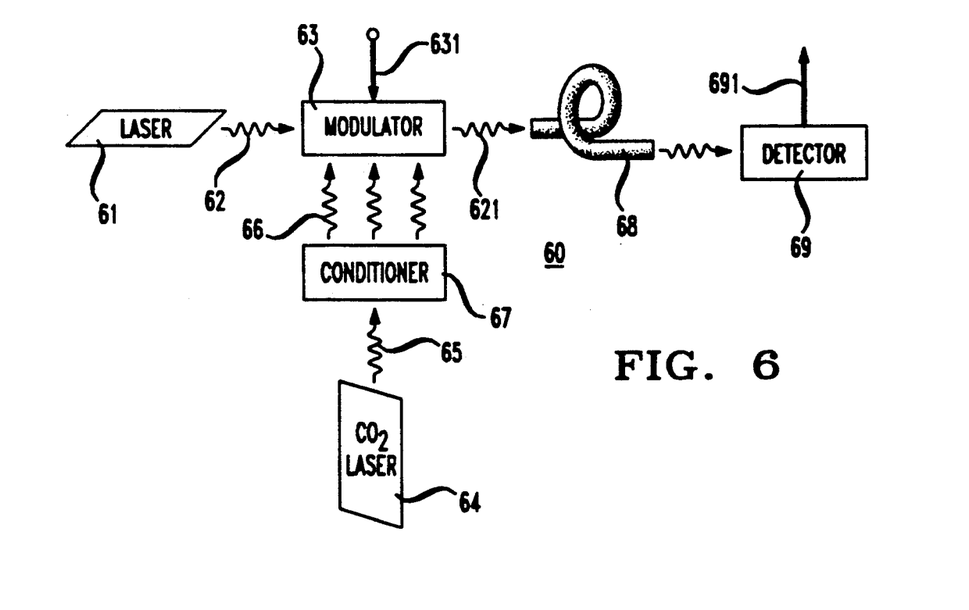
FIG. 6 schematically depicts an exemplary article according to the invention.

Articles according to the invention can assume a variety of forms, including electronic assemblies or subassemblies that comprise optical interconnects, optical data processing apparatus, and optical communication systems. An exemplary optical communication system according to the invention is schematically depicted in FIG. 6, wherein laser 61 emits IBR 62 that impinges on modulator 63. $CO_2$-laser 64 emits ISBR 65 from which a single mode is selected which is TM polarized and optionally line-focussed, all by means of conditioner 67. Conditioned ISBR 66 is caused to be incident on the active region of 63, substantially as shown in FIG. 5. Electrical modulation signal 631 is applied to 63, resulting in modulation of IBR such that modulated IBR 621 emerges from 63. The modulated IBR is optionally coupled into optical fiber 68, transmitted therethrough to detector 69, with detector output 691 available to be provided to appropriate responsive means that are not shown.

Figure 11:
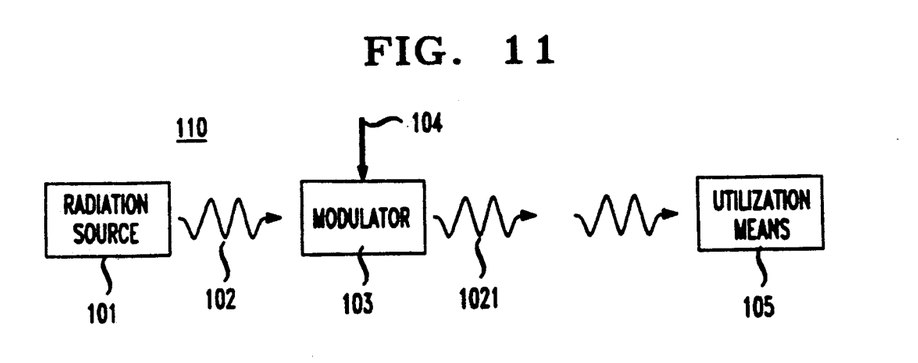
FIG. 11 schematically depicts a further article according to the invention.

Another exemplary embodiment 110 is schematically depicted in FIG. 11, wherein radiation source 101 emits CW ISBR 102, the radiation impinges on modulator 103 according to the invention and is modulated in accordance with electrical modulator signal 104. Modulated ISBR 1021 is emitted from 103 and caused to impinge on utilization means 105.

EXAMPLE 4

A semiconductor body, substantially as shown in FIG. 5, is produced as follows. On a conventional semi-insulating GaAs substrate wafer are formed in sequence: a modulation-doped multi-QW lower contact region (containing 10 periods, each period consisting of a 6.5 nm undoped GaAs QW, a 15 nm undoped $Al_{0.35}Ga_{0.65}As$ spacer, a 10 nm Si-doped $Al_{0.35}Ga_{0.65}As$ spacer; the latter three layers constituting the barrier layer that separates adjacent QWs); an undoped 2 $\mu$m AlAs lower cladding layer; a modulation-doped multi-QW core region (containing 30 periods, each period being as described above, except that the QW layer has a thickness of 8.2 nm); an undoped 2 $\mu$m AlAs upper cladding layer; and an upper contact region identical to the lower contact region. Doping levels are The multilayer QWs. The multilayer structure is grown by MBE. After completion of layer growth 5 $\mu$m wide ridges are formed by conventional lithography and etching, narrow n+ regions are formed by dopant in-diffusion on the upper and lower contact regions, and conventional Au/Ge metallization is formed on the n+ regions, substantially as shown in FIG. 5. After cleaving to produce 100 $\mu$m long bodies, approximately 0.8 $\mu$m CW radiation from a GaAs QW laser is impinged in longitudinal direction on the core-region of the structure, single mode TM polarized radiation from a $CO_2$ laser is impinged onto the core region in the lateral direction, and an AC modulation voltage is applied across the two metallized contacts. The device performed as expected, the emitted 0.8 $\mu$m radiation exhibits modulation in accordance with the AC modulation voltage.

We claim:
1. An article comprising a semiconductor body that comprises a multilayer structure comprising at least one quantum well (QW), associated with said QW being a bandgap energy and a subband energy difference; associated with free carriers of a first conductivity type in the QW is a free carrier distribution function, and associated with the body is a lattice temperature; the article further comprising means for providing a modulation signal to the body;

characterized in that the article further comprises
a) means for providing electromagnetic radiation of a first wavelength ("inter-band radiation" or "IBR") to the body, the first wavelength selected to correspond to said bandgap energy;
b) means for providing electromagnetic radiation of a second wavelength ("inter-subband radiation" or "ISBR") to the body, the second wavelength being longer than the first wavelength and being selected such that the free carrier distribution function can be varied by means of the ISBR in accordance with the modulation signal, such that the IBR is modulated in accordance with said modulation signal, the modulated IBR being emitted from the body; and
c) modulated IBR utilization means.

2. Article of claim 1, wherein the means for providing the modulation signal comprise contact means adapted for applying an electric field across the QW, such that the subband energy difference can be changed by means of the Stark effect.

3. Article of claim 2, wherein the second wavelength is selected such that ISBR is substantially not absorbed in the QW for a first given value of the applied electric field, and such that ISBR is absorbed in the QW for a second given value of applied electric field.

4. Article of claim 2, wherein the contact means comprise at least one contact QW, the composition and thickness of said contact QW selected such that said ISBR is substantially not absorbed in the contact QW.

5. Article of claim 1, wherein the means for providing ISBR comprise polarizing and mode selecting means such that the ISBR provided to the body is substantially single mode and linearly polarized with electric vector substantially perpendicular to the plane of the QW, said polarization to be designed "TM" polarization.

6. Article of claim 1, wherein the means for providing a modulation signal comprise means for modulating the ISBR.

7. Article of claim 1, wherein the free carrier distribution function is substantially of the Fermi-Dirac form, characterized by a free carrier temperature, and changing the distribution function comprises raising the free carrier temperature above the lattice temperature.

8. Article of claim 1, wherein the body comprises a multiplicity of QWs, wherein the free carriers are electrons, and wherein the body comprises direct-gap semiconductor material.

9. Article of claim 8, wherein the direct-gap semiconductor material is III/V semiconductor material.

10. Article of claim 1, wherein the body is doped such that the free carriers of the first conductivity type are present in the QW.

11. Article of claim 1, wherein the modulated IBR comprises pulses of width less than 10 ps.

12. Article of claim 1, wherein the body and the means of a) are monolithically integrated.

13. Article of claim 3, wherein the body is adapted for emitting modulated ISBR, and the article comprises means for utilizing the modulated ISBR emitted by the body.

14. Method of operating an article that comprises a semiconductor body comprising a multilayer structure comprising at least one quantum well (QW); associated with said QW being a bandgap energy and a subband energy difference; associated with free carriers of a first conductivity type in the QW being a free carrier distribution function, and associated with the body is a lattice temperature; the method comprising
a) providing electromagnetic radiation of a first wavelength to the body; and
b) providing a modulation signal to the body; characterized in that
c) the first wavelength is selected to correspond to said bandgap energy, the first wavelength radiation to be referred to as "inter-band radiation" or "IBR"; and the method further comprises
d) providing electromagnetic radiation (to be referred to as "inter-subband radiation" or "ISBR") of a second wavelength to the body, the second wavelength being longer than the first wavelength and selected such that the free carrier distribution function is varied in accordance with the modulation signal, such that the IBR is modulated in accordance with the modulation signal, the modulated IBR being emitted from the body; and
e) providing modulated IBR utilization means.

15. Method of claim 14, wherein b) comprises applying an electric field across the QW, such that the subband energy difference is changed by means of the Stark effect.

16. Method of claim 15, comprising selecting the second wavelength such that ISBR is substantially not absorbed for a first value of applied electric field, and such that ISBR is absorbed in the QW for a second value of applied electric field.

17. Method of claim 16, comprising providing contact means that comprise at lest one contact QW selected such that ISBR is substantially not absorbed in the contact QW.

18. Method of claim 14, comprising providing substantially single mode and linearly polarized ISBR to the body, with the electric vector of said ISBR being substantially perpendicular to the plane of the QW.

19. An article comprising
a) a semiconductor body;
b) contact means adapted for providing an electric field across the body, the contact means comprising at least one substantially planar contact quantum well (QW) layer, with a charge carrier gas in said contact QW layer;
c) means for providing electromagnetic radiation to the body, associated with said radiation being a photon energy, a polarization and an electric vector, said means for providing the radiation being adapted for providing to the body radiation that is, in the body, substantially TM polarized, with electric vector substantially normal to the plane of the contact QW; and
d) associated with the charge carrier gas in the contact QW layer is a minimum energy that can be absorbed from said polarized radiation; and
e) the composition and thickness of the contact QW layer are selected such that said photon energy is less than said minimum energy.

20. An article according to claim 19, wherein associated with said contact QW layer are at least two energy subbands, associated with said at least two subbands being an inter-subband separation, and wherein said minimum energy is the intersubband separation.

21. An article comprising
a) at least a first quantum well (QW) in a semiconductor body;
b) means for providing a modulating signal to the body, said means comprising contact means adapted for applying an electric field across the body;
c) means for providing inter-subband radiation (ISBR) to the body, associated with said ISBR is a photon energy selected such that ISBR is substantially not absorbed in the first QW for a first given value of applied electric field, and such that ISBR is absorbed in the first QW for a second given value of applied electric field, whereby modulated ISBR can be emitted from the body; and
d) modulated ISBR utilization means; wherein
e) said contact means comprise at least a second quantum well, to be designated "contact QW", with a carrier gas in said contact QW, associated with the carrier gas in the contact QW is a minimum energy which can be absorbed from said ISBR, the composition and thickness of the contact QW selected such that the photon energy associated with ISBR is less than said minimum energy.

22. Article according to claim 21, wherein said minimum energy is the intersubband separation between a first and a second bound state energy band.

* * * * *